Oct. 11, 1960 G. A. CARLSON 2,955,392
BELT PULLEY AND BEARING ASSEMBLY
Filed Oct. 20, 1958
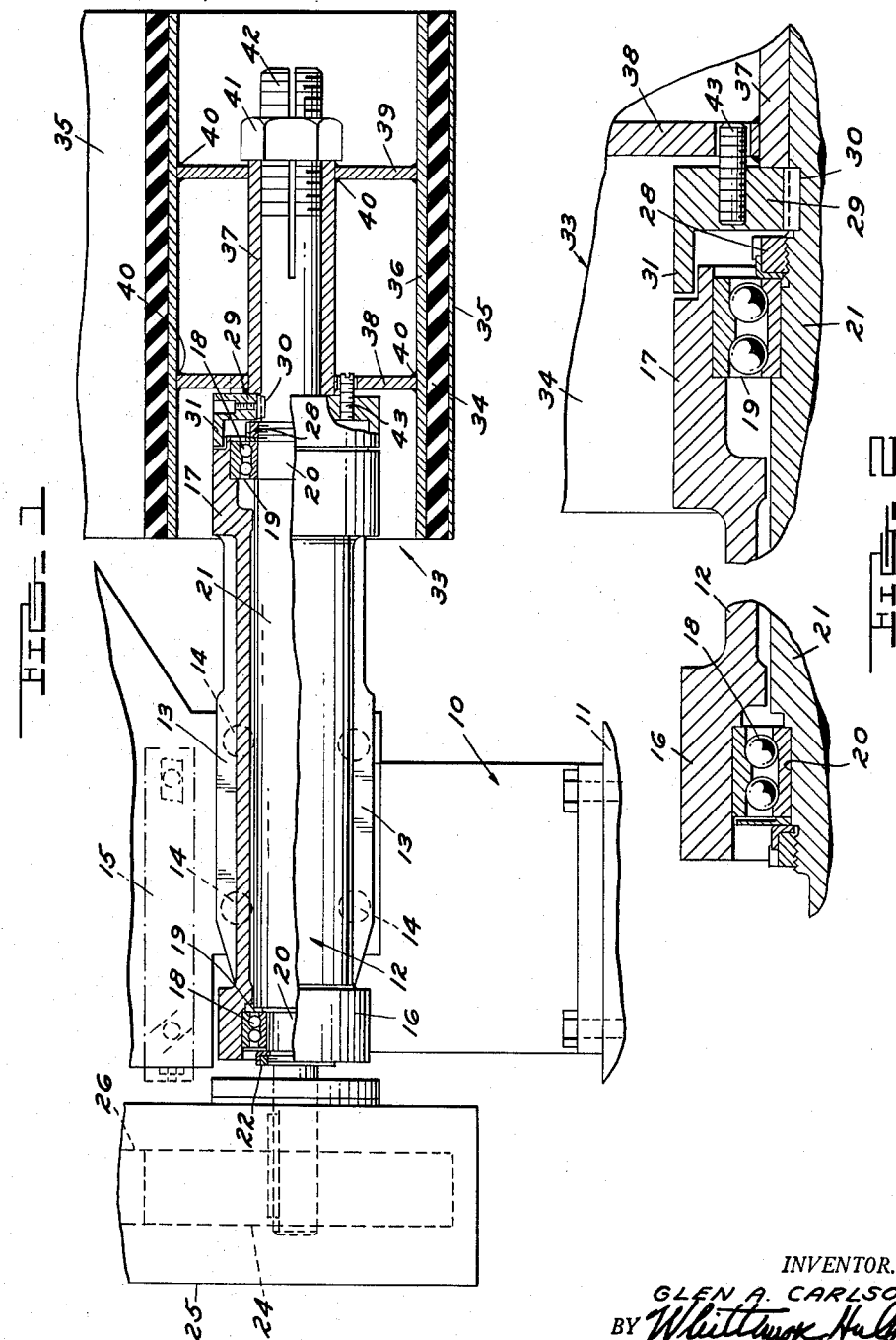
INVENTOR.
GLEN A. CARLSON
BY Whittemore, Hulbert,
Belknap
ATTORNEYS United States Patent Office 2,955,392
Patented Oct. 11, 1960

2,955,392

BELT PULLEY AND BEARING ASSEMBLY

Glen A. Carlson, 1350 Country Club Drive,
Bloomfield Hills, Mich.

Filed Oct. 20, 1958, Ser. No. 768,413

8 Claims. (Cl. 51—168)

The present invention relates to an improved assembly of a pulley and anti-whip bearing provisions for the same, the pulley being illustrated as one around which an endless abrasive or like belt is trained for engagement with a work piece to be ground or polished. However, structural details of the arrangement are suitable for adaptation in other types of pulley and wheel installations, and, indeed, certain features of the invention are related to what is shown in a copending application of mine, Serial No. 569,508, filed March 5, 1956, to a "Wheel Spool Adapter," now Letters Patent 2,860,457, dated Nov. 18, 1958.

It is an object of the invention to provide simplified and rugged supporting pulley and bearing means for a high speed operating member, such as an abrasive belt, in which a driven shaft is journalled at substantially spaced points along its length by anti-friction or like bearings, and in which an end of a pulley supported by the shaft for high speed rotation is brought well inwardly over one of these bearings for increased stability of rotary support and maximum elimination of radial whip.

Another object is to provide a pulley and bearing arrangement in which the pulley has an outboard bearing support of its rotary shaft in a tubular, cantilever-supported bearing sleeve of considerable length, the outboard feature making for ease and speed in changing belts.

More specifically, it is an object to provide a bearing and pulley assembly featuring an elongated sleeve-like fixed bearing housing or body, with roller or equivalent anti-friction bearings at opposite ends of this housing or body rotatably mounting an elongated shaft or spindle in a stable, anti-radial thrust manner; and in which a rotary belt pulley or the like comprising an outer drum and inner spacing sleeve has that sleeve telescoped on the free outer end of the shaft or spindle. The result is that the inner end of the pulley, as fixedly clamped by the spacing sleeve, projects well inwardly over the adjacent outer end shaft bearing. A considerable portion of radial stress is thus borne directly in the zone of the bearing.

The foregoing as well as other objects will become more apparent as this description proceeds, especially when considered in connection with the accompanying drawing illustrating the invention, wherein:

Fig. 1 is a fragmentary view of a typical abrasive belt grinding or polishing unit incorporated the improved belt pulley and bearing provisions of the invention, the section being axially of the bearing and pulley structure; and Fig. 2 is an enlarged fragmentary view in similar section more clearly illustrating the details.

Referring first to Fig. 1, the reference numeral 10 generally designates a suitable rugged upright support of a grinding and polishing unit of conventional type, appropriately bolted to a fixed base 11. The reference numeral 12 generally designates an elongated sleeve-like bearing housing of the bearing structure of the invention, this housing being appropriately flanged at 13 for its securement, as by bolts or studs 14, to the standard 10 or other suitable fixed mount on the equipment. The reference numeral 15 generally designates provisions of a conventional sort to enable adjustment of the bearing unit as desired.

Adjacent its outer ends the housing 12 is provided with radially enlarged annular axial flanges 16, 17, and these are counterbored to receive the outer races 18 of suitable end and radial thrust ball bearings 19.

The inner races of the bearings 19, 19 respectively engage reduced portions 20 of a pulley drive shaft 21 extending through the housing 12, with appropriate clearance between bearings 19, 19. The inner race of the left hand bearing 19 is held in place by a suitable retainer ring 22 threaded on the shaft, and the adjacent end of the shaft has a suitable pulley 24 keyed or otherwise drivingly connected thereto. The drive pulley 24 is housed in a suitable protective shield 25, and the lower portion of and endless drive belt 26 is trained thereabout, being driven from above by an appropriate motor operated drive pulley (not shown).

The inner race of the right hand bearing 19 is also held in place by a retainer ring 28 threaded on shaft 21 and a driving collar 29 in keyed or similar driving connection at 30 with the shaft is provided just to the right of the retainer ring 28, being equipped with an annular flange 31 which axially over-extends the adjacent end of the bearing housing enlargement 17, but with radial running clearance relative to the latter.

The reference numeral 33 generally designates the driven belt pulley of the assembly. It is provided with a vulcanized facing sleeve 34 of rubber or synthetic rubber to afford driving friction with the endless abrasive belt 35. This facing surrounds a cylindrical axially elongated pulley drum 36, and an elongated coaxial driving hub 37 is fixedly connected to the drum 36 by means of centrally apertured disks 38, 39 receiving the hub 37, the disks 38, 39 being welded to the drum and hub at 40.

The driving hub 37 serves as a spacer and clamp for the pulley 33. It axially abuts the drive collar 29 to its left, and its right hand end is engaged and clamped by a nut 41 applied to the threaded outer end 42 of shaft 21.

Driving collar 29 is provided with a plurality of axially extending drive studs 43, radially outwardly of the hub 37, and these studs are received in similarly spaced recesses in the adjacent drum disk 38, thus to provide a strong rotative driving connection of pulley 33 to shaft 21, in addition to the drive action transmitted from the right hand shaft 21 through nut 41 to hub 37.

As seen from the above, the invention affords a pulley mount which is simple and inexpensive in its parts, but very strong and rugged. The inner overhang of the left hand end of drum 33 brings a substantial share of the radial thrust on the drum over the right hand bearing 19, and the elongated hub 37 applies the remainder of the load to the shaft 21 in a well distributed manner. The wide spacing of the inner or left bearing 19 from the right hand bearing 19 also gives stability and most effectively combats radial whip at high operating speeds.

What I claim as my invention is:

1. The combination of bearing structure and a high speed member journalled thereby, comprising an axially elongated rotary drum having a sleeve-like mounting hub fixed thereto and internally coaxial therewith, with an axial end portion of said drum substantially overlapping outwardly the corresponding axial end portion of said hub, a fixed and axially elongated bearing sleeve having an end portion telescoped substantially within said end portion of said drum, an elongated shaft coaxially received in said fixed bearing sleeve and said hub, and means mounting and driving said drum and hub for rotation with said shaft, including a radial bearing element between said bearing sleeve and drum in the axial zone in which said drum overlaps said hub and sleeve end portions.

2. The combination of bearing structure and a high speed member journalled thereby, comprising an axially elongated rotary drum having a sleeve-like mounting hub fixed thereto and internally coaxial therewith, with an axial end portion of said drum substantially overlapping outwardly the corresponding axial end portion of said hub, a fixed and axially elongated bearing sleeve having an end portion telescoped substantially within said end portion of said drum, an elongated shaft coaxially received in said fixed bearing sleeve and said hub, and means mounting and driving said drum and hub for rotation with said shaft, including a radial bearing element between said bearing sleeve and drum in the axial zone in which said drum overlaps said hub and sleeve end portions, and a further radial bearing element between said shaft and sleeve adjacent the opposite end portion of the latter.

3. The combination of bearing structure and a high speed member journalled thereby, comprising an axially elongated rotary drum having a sleeve-like mounting hub fixed thereto and internally coaxial therewith, with an axial end portion of said drum substantially overlapping outwardly the corresponding axial end portion of said hub, a fixed and axially elongated bearing sleeve having an end portion telescoped substantially within said end portion of said drum, an elongated shaft coaxially received in said fixed bearing sleeve and said hub, and means mounting and driving said drum and hub for rotation with said shaft, including a radial bearing element between said bearing sleeve and drum in the axial zone in which said drum overlaps said hub and sleeve end portions, a driving collar fixed on said shaft adjacent said first named bearing element, and means affording a driving connection between said drum and hub and said driving collar.

4. The combination of bearing structure and a high speed member journalled thereby, comprising an axially elongated rotary drum having a sleeve-like mounting hub fixed thereto and internally coaxial therewith, with an axial end portion of said drum substantially overlapping outwardly the corresponding axial end portion of said hub, a fixed and axially elongated bearing sleeve having an end portion telescoped substantially within said end portion of said drum, an elongated shaft coaxially received in said fixed bearing sleeve and said hub, and means mounting and driving said drum and hub for rotation with said shaft, including a radial bearing element between said bearing sleeve and drum in the axial zone in which said drum overlaps said hub and sleeve end portions, and a further radial bearing element between said shaft and sleeve adjacent the opposite end portion of the latter, a driving collar fixed on said shaft adjacent said first named bearing element, and means affording a driving connection between said drum and hub and said driving collar.

5. The combination of bearing structure and a high speed member journalled thereby, comprising an axially elongated rotary drum having a sleeve-like mounting hub fixed thereto and internally coaxial therewith, a fixed and axially elongated bearing sleeve having an end portion telescoped substantially within an end portion of said drum, an elongated shaft coaxially received in said fixed bearing sleeve and said hub, and means mounting and driving said drum and hub for rotation with said shaft, including a radial bearing element between said bearing sleeve and shaft in the axial zone in which said drum overlaps said hub and sleeve end portions.

6. The combination of bearing structure and a high speed member journalled thereby, comprising an axially elongated rotary drum having a sleeve-like mounting hub fixed thereto and internally coaxial therewith, a fixed and axially elongated bearing sleeve having an end portion telescoped substantially within an end portion of said drum, an elongated shaft coaxially received in said fixed bearing sleeve and said hub, and means mounting and driving said drum and hub for rotation with said shaft, including a radial bearing element between said bearing sleeve and shaft in the axial zone in which said drum overlaps said hub and sleeve end portions, and a further radial bearing element between said shaft and sleeve adjacent the opposite end portion of the latter.

7. The combination of bearing structure and a high speed member journalled thereby, comprising an axially elongated rotary drum having a sleeve-like mounting hub fixed thereto and internally coaxial therewith, a fixed and axially elongated bearing sleeve having an end portion telescoped substantially within an end portion of said drum, an elongated shaft coaxially received in said fixed bearing sleeve and said hub, and means mounting and driving said drum and hub for rotation with said shaft, including a radial bearing element between said bearing sleeve and shaft in the axial zone in which said drum overlaps said hub and sleeve end portions, a driving collar fixed on said shaft adjacent said first named bearing element, and means affording a driving connection between said drum and hub and said driving collar.

8. The combination of bearing structure and a high speed member journalled thereby, comprising an axially elongated rotary drum having a sleeve-like mounting hub fixed thereto and internally coaxial therewith, a fixed and axially elongated bearing sleeve having an end portion telescoped substantially within an end portion of said drum, an elongated shaft coaxially received in said fixed bearing sleeve and said hub, and means mounting and driving said drum and hub for rotation with said shaft, including a radial bearing element between said bearing sleeve and shaft in the axial zone in which said drum overlaps said hub and sleeve end portions, and a further radial bearing element between said shaft and sleeve adjacent the opposite end portion of the latter, a driving collar fixed on said shaft adjacent said first named bearing element, and means affording a driving connection between said drum and hub and said driving collar.

References Cited in the file of this patent

UNITED STATES PATENTS

| 1,992,105 | Walker | Feb. 19, 1935 |
| 2,860,457 | Carlson | Nov. 18, 1958 |